United States Patent Office 2,909,581
Patented Oct. 20, 1959

2,909,581

CATALYTIC ALKYLATION PROCESS

Kenneth J. Frech, Oakmont, and Raymond C. Odioso, Glenshaw, Pa., assignors to Gulf Research & Development Company, Pittsburgh, Pa., a corporation of Delaware No Drawing. Application October 14, 1955
Serial No. 540,632

6 Claims. (Cl. 260—683.43)

This invention relates to a process for reacting olefins with paraffinic hydrocarbons and more particularly to an alkylation process for the production of hydrocarbons boiling in the gasoline boiling range and having a high octane number.

The term alkylation is used to designate processes for the combination of olefins with other compounds such as paraffinic hydrocarbons. A usual purpose of alkylation processes is to utilize gaseous or low boiling point liquid hydrocarbons available in refineries to produce high octane number hydrocarbons of higher molecular weight having boiling points in the gasoline boiling range. In an alkylation reaction, one or more mols of olefins are combined with a mol of the non-olefinic reactant. For example, one mol of an olefin combines with a mol of isoparaffin. Thus, alkylation is distinguished from olefin polymerization processes in which two or more mols of olefins are combined to form a polymer of higher molecular weight. Since the gaseous olefins are of greater value than paraffinic hydrocarbons of substantially the same molecular weight, it is desirable to avoid polymerization in order to obtain the highest possible yield of high octane number hydrocarbons from a given quantity of olefins.

Alkylation can be accomplished in non-catalytic thermal processes by heating a mixture of olefins and paraffinic hydrocarbons at high temperatures and pressures. Temperatures in the range of about 925° to 1000° F. and pressures of about 4000 to 10,000 pounds per square inch are ordinarily employed in order to obtain appreciable yields of alkylate. It has been suggested that non-catalytic processes employ extremely high pressures, for example, above 100,000 pounds per square inch to increase the yield of alkylate to satisfactory levels. At the high temperatures and pressures employed in thermal alkylation processes, there is substantial polymerization of the olefins which reduces the yield of alkylate obtained from a given amount of olefin feed stock. The yield of alkylate is further limited by substantial cracking of alkylate formed to hydrocarbons of lower boiling point at the high temperatures and pressures of thermal alkylation processes.

Several catalytic alkylation processes have been developed and used extensively in commercial operations. The usual catalytic processes use catalysts such as aluminum chloride, hydrogen fluoride, sulfuric acid, or boron trifluoride. These catalysts permit the use of lower temperatures and pressures than thermal alkylation processes, with an increased yield of alkylate and reduction in the polymerization of the olefins. However, in catalytic alkylation processes using the catalysts named, corrosion difficulties are encountered along with appreciable catalyst consumption.

It has been suggested that catalysts such as organic halogen compounds, particularly organic chlorides, are useful as homogeneous catalysts in alkylation processes. Other catalysts that have been suggested are the elemental halogens, particularly chlorine and bromine. Unfortunately, the alkylate is contaminated with halogens which reduce the octane number of the total reaction product and make further treating of the alkylate to remove the halogens necessary before it can be used satisfactorily as a motor fuel.

This invention resides in a process for the alkylation of paraffinic hydrocarbons with olefins in the presence of about 1½ to 5 percent of an organic peroxide which serves as a catalyst for the alkylation reaction. The term organic peroxide is used to designate organic compounds in which an organic radical has been substituted for one or both of the hydrogens of hydrogen peroxide. The process may be carried out at mild conditions of temperature and pressure to give high yields of a highly branched alkylate free of compounds detrimental to the octane number of the alkylate.

The organic peroxides used as catalysts in this process are any organic compounds containing the radical —O—O—. They can be thought of as being formed by the substitution of organic radicals for one or both of the hydrogens of hydrogen peroxide. The organic radicals substituted for the hydrogen of hydrogen peroxide may be aryl, aralkyl, alkyl or alicyclic radicals. Organic peroxides containing substituted hydrocarbon radicals can also be used. The peroxides can be asymmetrical as a result of the substitution of different organic radicals for the hydrogens of hydrogen peroxide. The asymmetric peroxides include, for example, and without being limited to, compounds in which one hydrogen of hydrogen peroxide is replaced with an alkyl group and one is replaced with an aryl group as well as compounds in which the two hydrogen atoms of hydrogen peroxide are replaced with different alkyl or different aryl groups.

Among the organic peroxides suitable for use in this invention are dimethyl peroxide, diethyl peroxide, methylethyl peroxide, di-tertiary butyl peroxide, and tertiary butyl hydroperoxide. Organic peroxides containing aromatic radicals which are suitable catalysts for this invention include benzoyl peroxide and peroxides such as ethyl benzoyl peroxide in which only one of the hydrogen atoms has been replaced with an aryl group. Peroxides containing substituted hydrocarbon groups are also suitable as long as the substituted group does not introduce elements detrimental to the alkylate. An example of a suitable peroxide containing substituted groups is diacetyl peroxide.

The olefins used in the alkylation process of this invention are in general those containing from 2 to 4 carbon atoms per molecule. Olefins containing 5 carbon atoms or more per molecule can be alkylated according to this invention; however, those olefins are generally valuable for uses other than in the production of motor fuels. Preferred olefins are branched chain compounds such as isobutene which aid in the production of highly branched products in the alkylate.

Paraffinic compounds of suitable molecular weight to produce alkylate boiling in the gasoline boiling range are alkylated with the olefins. In general, the paraffinic hydrocarbons employed contain from 3 to 5 carbon atoms per molecule and may be either branched or straight chain compounds. The branched paraffins are preferred because of their high reactivity with olefins and the increase in the yield of branched chain alkylate produced by them. The olefinic and paraffinic hydrocarbons used in this process can be obtained from any suitable source. Refinery gases are a convenient source.

The olefinic and other hydrocarbons can be introduced into the reactor in separate relatively pure streams or can be mixed prior to introduction into the reactor. Hydrocarbons normally present in refinery gas streams do not interfere with the reaction except for their dilution effect; hence, it is not necessary to employ elaborate feed preparation processes to obtain substantially pure olefin and paraffinic or aromatic streams. The ratio of olefins to the hydrocarbons with which they are combined should be maintained within the ranges set forth below to reduce the polymerization of the olefins.

In the alkylation process of this invention, a mixture of the olefins and paraffinic hydrocarbons, and organic peroxide is heated to a temperature in the range of about 550° to 800° F. in a reactor maintained at a pressure of about 500 to 10,000 pounds per square inch gauge. When a paraffin is reacted with the olefin to form the alkylate, the molar ratio of the olefins to the paraffin is in the range of about 1:2 to 1:10 or even lower. An olefin to paraffin molar ratio of about 1:5 is preferred. With this ratio of olefins to paraffins, the extent of polymerization of the olefins is small and alkylation of the olefins with the paraffin is increased.

The organic peroxide used as the catalyst in the alkylation process of this invention is present in concentrations ranging from about 1½ to 5 percent or more of the total mixture. This concentration of the organic peroxide allows the alkylation reaction to proceed rapidly to produce good yields of alkylate. Larger quantities of organic peroxide can be used but will markedly increase the cost of the materials charged to the reaction without a corresponding improvement in the yield of alkylate. The organic peroxide does not enter directly into the alkylation reaction as shown by the absence of oxygen in the alkylate; however, oxygen containing compounds are present in the reaction product. In contrast with the elemental halogens or halogen containing compounds introduced by the use of alkyl halides, for example, as catalysts, the small amount of oxygen containing compounds present in the reaction product does not impair its octane number, and it is not necessary to separate the alkylate and oxygen containing products.

Alkylation of paraffinic hydrocarbons by this invention is accomplished in times of contact of the reactants and the peroxides at reaction conditions above about one minute. Preferred contact times are in the range of about 5 to 30 minutes; however, longer times can be used, if desired. The desired contact of the reactants and catalyst can be obtained by conventional batch or continuous processes for bringing reactants into contact.

The following examples illustrate the advantages of the alkylation process of this invention.

*Example I*

108 grams (2.6 mols) of propylene, 354 grams (6.1 mols) of isobutane and 20 grams (0.14 mol) of di-tertiary butyl peroxide were introduced into a 1.8 liter high pressure shaker bomb. The bomb was heated to 600° F. and maintained at that temperature for a period of 3½ hours. The maximum pressure developed on the bomb was 2400 pounds per square inch gauge. The bomb was cooled overnight and the unreacted gases were delivered to a gas holder. 75.5 grams of liquid product and 194.1 liters of gas were obtained.

The total yield of alkylate was 70 percent, based on the total propylene charge. The liquid product was fractionated into a series of cuts ranging in boiling points from an initial point of 90° F. to a maximum temperature of 360° F. The isoheptane cut amounted to 22.8 percent of the total liquid product and contained 9.4 percent triptane.

*Example II*

The procedure of Example I was repeated with the exception that no di-tertiary butyl peroxide was added to the contents in the bomb. A yield of 17 grams of liquid was obtained, corresponding to 15.9 percent total alkylate, based on propylene. The quantity of total alkylate was too small to determine the concentration of triptane present.

*Example III*

273 grams (4.7 mols) of isobutane, 31 grams (0.74 mol) of propylene and 8.5 grams (.06 mol) of di-tertiary butyl peroxide were introduced into a one-liter bomb which was heated to 752° F. The pressure on the bomb was 3650 pounds per square inch gauge. The bomb was maintained at 752° F. for one-half hour and then vented to traps and cooled in a Dry-Ice-acetone mixture. 20.85 grams of liquid product were collected to give an alkylate yield of 67 percent, based on the propylene charge.

The above examples show that the use of organic peroxide for alkylation of olefins results in a marked increase in the yield of alkylate. The organic peroxides permit substantial yields of alkylate to be obtained at pressures below those required in thermal alkylation processes. The organic peroxide is added in small amounts, of the order of about 1½ percent to 5 percent of the reaction mixture, hence, the cost of the organic peroxide employed is relatively low. The alkylate obtained is characterized by a high concentration of highly branched compounds such as triptane (2,2,3-trimethyl butane) having high octane numbers. Moreover, the alkylate obtained is free of elemental halogens or halogen containing compounds and contains only small amounts of oxygen containing compounds. The oxygen containing compounds often have excellent anti-knock properties and do not have an adverse effect upon the octane number of the alkylate.

We claim:

1. An alkylation process for the production of a highly branched alkylate in a reaction product of a high octane number comprising reacting an olefin containing 2 to 4 carbon atoms per molecule with a paraffinic hydrocarbon containing 3 to 5 carbon atoms per molecule in the presence of an organic peroxide at a temperature in the range of 550 to 800° F. and a pressure in the range of 500 to 10,000 pounds per square inch gauge to form an alkylate boiling in the gasoline boiling range, said organic peroxide constituting about 1½ to 5 percent of the total reaction mixture.

2. A process as set forth in claim 1 in which the ratio of olefins to paraffinic hydrocarbons present in the reaction mixture is in the range from about 1:2 to 1:10.

3. A process for the alkylation of propylene and isobutane to form a highly branched alkylate boiling in the gasoline boiling range comprising reacting propylene and isobutane in the presence of an organic peroxide at a temperature in the range of about 550° to 800° F. and a pressure in the range of about 500 to 10,000 pounds per square inch, the ratio of propylene to isobutane being in the range of about 1:2 to 1:10 and the concentration of the organic peroxide in the total reaction mixture being in the range of about 1½ to 5 percent.

4. A process as set forth in claim 3 in which the organic peroxide is di-tertiary butyl peroxide.

5. A process for the alkylation of olefins containing 2 to 4 carbon atoms per molecule with paraffinic hydrocarbons containing 3 to 5 carbon atoms per molecule in the presence of an organic peroxide, comprising mixing the olefins and paraffins in the presence of an organic peroxide at a temperature in the range of about 550° F. to 800° F. and a pressure in the range of about 500 to 10,000 p.s.i. to produce an alkylate boiling in the gasoline boiling range, the ratio of olefin to paraffin being in the range of about 1:2 to 1:10, the organic peroxide being a derivative of hydrogen peroxide in which at least one of the hydrogen atoms in the hydrogen peroxide is replaced with an organic radical selected from the group consisting of alkyl, aralkyl, aryl and alicyclic radicals.

6. A process for the alkylation of propylene and isobutane to form an alkylate boiling in the gasoline boiling range and having a high octane number comprising reacting propylene and isobutane in the presence of a catalyst consisting essentially of an organic peroxide at a temperature in the range of 550° F. to 800° F. and a pressure in the range of about 500 to 10,000 p.s.i. for a period in the range of about 5 to 30 minutes, the ratio of propylene to isobutane being in the range of about 1:2 to 1:10 and the concentration of the organic peroxide in the total reaction mixture being in the range of about 1.5 to 5%.

References Cited in the file of this patent

UNITED STATES PATENTS

| | | |
|---|---|---|
| 2,346,770 | Lobdell et al. | Apr. 18, 1944 |
| 2,431,685 | Cade | Dec. 2, 1947 |
| 2,459,775 | Passino | Jan. 18, 1949 |
| 2,467,326 | Mavity | Apr. 12, 1949 |
| 2,469,335 | Johnson et al. | May 3, 1949 |
| 2,552,980 | Ladd et al. | May 15, 1951 |
| 2,570,407 | Upham | Oct. 9, 1951 |
| 2,598,724 | Schmerling | June 3, 1952 |
| 2,660,610 | Erchak | Nov. 24, 1953 |
| 2,748,178 | Pines et al. | May 29, 1956 |
| 2,759,031 | Benoit | Aug. 14, 1956 |